(12) United States Patent
Shaw

(10) Patent No.: US 10,299,633 B2
(45) Date of Patent: May 28, 2019

(54) MANUAL FROTHING DEVICE

(71) Applicant: DAVIDsTEA INC., Town of Mount Royal (CA)

(72) Inventor: David Shaw, Montréal (CA)

(73) Assignee: DAVIDsTEA INC., Town of Mount Royal, Quebec (CA)

( * ) Notice: Subject to any disclaimer, the term of this patent is extended or adjusted under 35 U.S.C. 154(b) by 422 days.

(21) Appl. No.: 15/000,408

(22) Filed: Jan. 19, 2016

(65) Prior Publication Data

US 2016/0206155 A1 Jul. 21, 2016

Related U.S. Application Data

(60) Provisional application No. 62/104,920, filed on Jan. 19, 2015.

(51) Int. Cl.
*B01F 3/12* (2006.01)
*A47J 43/27* (2006.01)
*B01F 13/00* (2006.01)
*B01F 15/00* (2006.01)
*B01F 3/04* (2006.01)

(52) U.S. Cl.
CPC .......... *A47J 43/27* (2013.01); *B01F 3/04446* (2013.01); *B01F 3/12* (2013.01); *B01F 13/0022* (2013.01); *B01F 15/00512* (2013.01)

(58) Field of Classification Search
USPC ........................................................ 366/130
See application file for complete search history.

(56) References Cited

U.S. PATENT DOCUMENTS 1,661,336 A  3/1928  Katz
2,791,467 A  5/1957  Leshin
4,003,555 A  1/1977  Swartz

FOREIGN PATENT DOCUMENTS

DE  102006060260 A1  6/2008
JP  3181593 U  2/2013

OTHER PUBLICATIONS

Konoike, JP3181593, machine translation, Feb. 2013.*
Office Action for Canadian Patent Application No. 2,918,089, dated Jan. 13, 2017.

* cited by examiner

*Primary Examiner* — Mark Halpern
(74) *Attorney, Agent, or Firm* — Pearl Cohen Zedek Latzer Baratz LLP

(57) ABSTRACT

A manual frothing device to be secured inside a liquid container partially filled in by a liquid to be frothed is disclosed. The frothing device comprises an elongated hollow member having a hollow top end; a convex shaped bottom end extending outwardly and comprising a plurality of cavities sized and shaped for retaining particles of a given size and side walls having openings of a size greater than the particles of a given size and wherein froth is generated by shaking the liquid in the container.

16 Claims, 4 Drawing Sheets

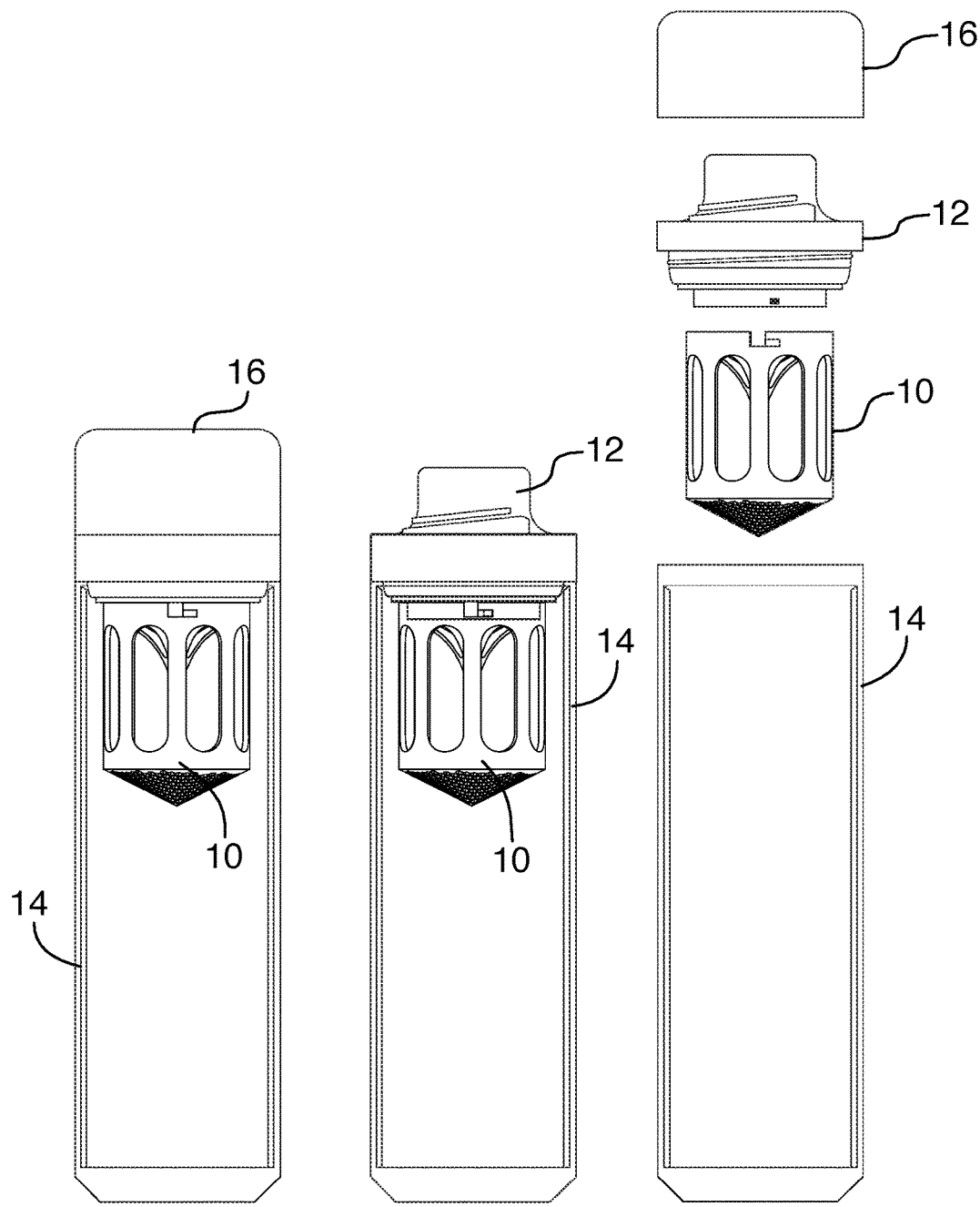

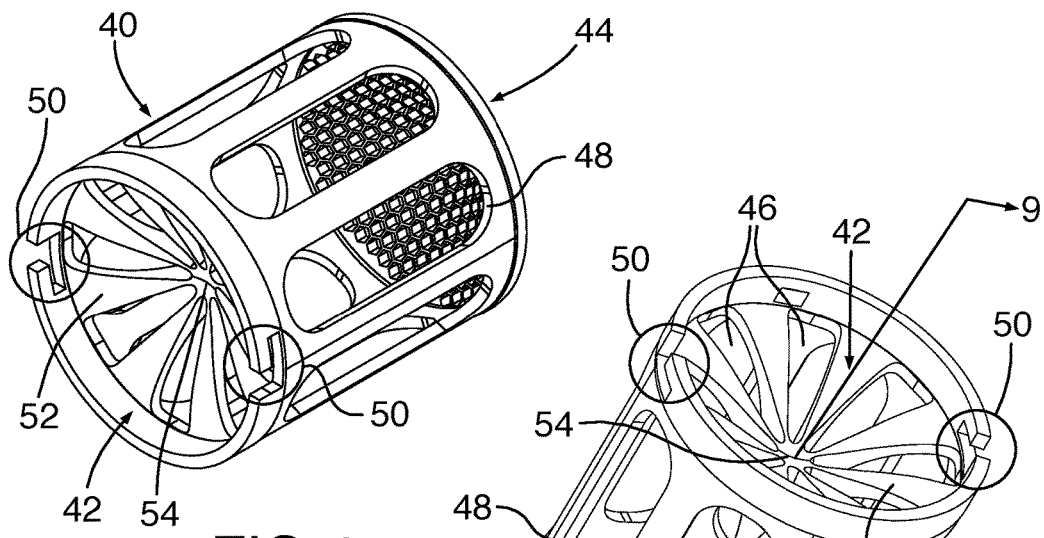
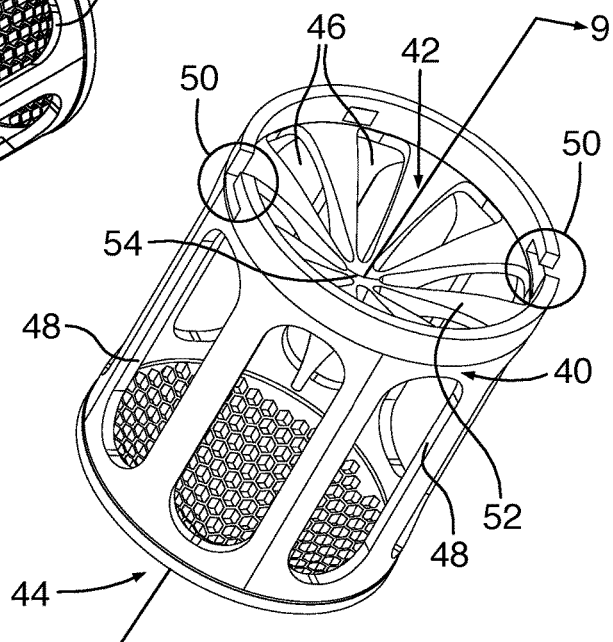
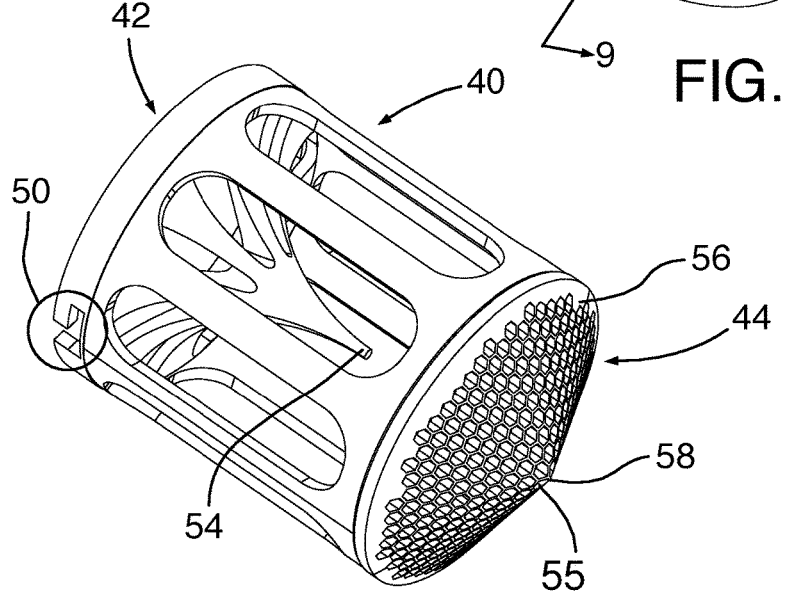
FIG.4
FIG.5
FIG.6

MANUAL FROTHING DEVICE

CROSS-REFERENCE TO RELATED APPLICATION

The present patent application claims the benefit of U.S. Provisional Patent Application No. 62/104,920, filed on Jan. 19, 2015 and entitled "Manual Frothing Device."

FIELD OF THE INVENTION

The invention relates to frothers. More precisely, the invention pertains to a manual frothing device.

BACKGROUND OF THE INVENTION

Being able to froth a drink is of great interest.

In fact, prior-art frothers are used by health enthusiasts to mix supplement powder into water by shaking the vessel.

Prior-art frothers are often comprised of a large mesh grid or a moving mesh ball which is meant to break up the powder and help it dissolve.

Unfortunately, they suffer from many disadvantages.

For instance, they require a lot of work by the user.

Another disadvantage is that the powder may still be found in the drink, which is not desirable for the user.

Frothing can also be done when preparing a Matcha tea.

As known to the skilled addressee, a key ingredient for the Matcha tea preparation is Matcha powder. The Matcha powder also has to be distributed evenly in the drink.

A first step in the preparation of the Matcha tea is the pouring of hot water into a bowl containing a given quantity of Matcha powder.

In a second step, a bamboo Matcha whisk is typically used for mixing the Matcha powder and the hot water together to therefore make the Matcha tea.

The skilled addressee will appreciate that the whisking of the mixture composed of Matcha powder and hot water will require from the user some effort and patience in order to obtain a proper result. This can create frustration.

There is a need for a frother that will overcome at least one of the above-identified drawbacks.

Features of the invention will be apparent from review of the disclosure, drawings and description of the invention below.

BRIEF SUMMARY OF THE INVENTION

According to a broad aspect, there is disclosed a manual frothing device to be secured inside a liquid container partially filled in by a liquid to froth, the frothing device comprising an elongated hollow member having a hollow top end; a convex-shaped bottom end extending outwardly and comprising a plurality of cavities sized and shaped for retaining particles of a given size; side walls having openings of a size greater than the particles of a given size and wherein froth is generated by shaking the liquid in the container.

In accordance with an embodiment, the manual frothing device further comprises securing means for securing the manual frothing device inside the liquid container.

In accordance with another embodiment, the securing means are located at a top end of the elongated hollow member.

In accordance with an embodiment, the securing means comprises two recesses that are sized and shaped for receiving two corresponding prongs located on a top member to be secured to the liquid container.

In accordance with an embodiment, the securing means comprise a screw thread.

In accordance with an embodiment, the hollow top end is made of a plurality of openings, each having a size greater than the particles of a given size.

In accordance with another embodiment, the hollow top end comprises eight holes.

In accordance with another embodiment, the side walls comprise eight openings of a size greater than the particles of a given size.

In accordance with an embodiment, the elongated hollow member has a cylindrical shape.

In accordance with another embodiment, the hollow top end comprises an outside surface extending inwardly in the manual frothing device.

In accordance with an embodiment, the outside surface is symmetrical around an axis extending vertically at a center of the elongated hollow member.

In accordance with another embodiment, the convex-shaped bottom end is symmetrical around an axis extending vertically at a center of the elongated hollow member.

In accordance with another embodiment, the plurality of cavities of the convex-shaped bottom end each has a diameter size of 2 mm.

In accordance with an embodiment, the convex-shaped bottom end is made of a metal mesh.

In accordance with another embodiment, the manual frothing device is made of Eastman Tritan™ acrylic.

In accordance with an embodiment, the manual frothing device further comprises a ball located in the elongated hollow member.

In accordance with another embodiment, the ball comprises a metal core coated with silicon.

In accordance with another broad aspect, there is disclosed a method for frothing a liquid, the method comprising providing a liquid container; inserting a liquid to froth in the liquid container; securing a manual frothing device inside the liquid container partially filled in by the liquid to froth, the frothing device comprising an elongated hollow member having a hollow top end; a convex-shaped bottom end extending outwardly and comprising a plurality of cavities sized and shaped for retaining particles of a given size; side walls having openings of a size greater than the particles of a given size; closing the liquid container using a top member; and shaking the liquid container to thereby forth the liquid.

In accordance with an embodiment, the method further comprises inserting powder in the liquid container.

In accordance with an embodiment, the liquid comprises hot water and the powder comprises Matcha powder.

In accordance with another embodiment, there is disclosed a use of the manual frothing device for frothing a liquid.

In accordance with another embodiment, there is disclosed a use of the manual frothing device for frothing a mixture comprising a liquid and powder.

An advantage of the manual frothing device disclosed herein is that it may distribute a powder evenly through a liquid to make a stable, homogeneous suspension.

Another advantage of the manual frothing device disclosed herein is that it introduces air into the liquid and creates a "froth" or foam on top as a result.

Another advantage of the manual frothing device disclosed herein is that it traps larger particles of powder, which might prove stubborn to break down, so that they do not transition to the user's recipient when the beverage is poured out.

BRIEF DESCRIPTION OF THE DRAWINGS

In order that the invention may be readily understood, embodiments of the invention are illustrated by way of example in the accompanying drawings.

FIG. 1 is a front elevation view of an embodiment of a manual frothing device secured inside a liquid container.

FIG. 2 is a front elevation view of an embodiment of a manual frothing device secured inside a liquid container wherein a cap covering the liquid container is removed.

FIG. 3 is a front elevation exploded view of an embodiment of a manual frothing device secured inside a liquid container.

FIG. 4 is a first perspective view of an embodiment of a manual frothing device.

FIG. 5 is a second perspective view of an embodiment of a manual frothing device.

FIG. 6 is a third perspective view of an embodiment of a manual frothing device.

Figure 7:
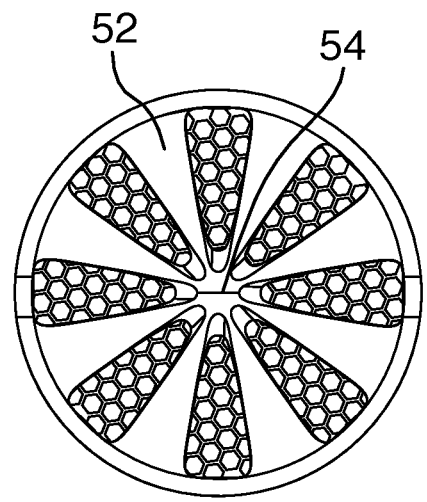
FIG. 7 is a top plan view of an embodiment of a manual frothing device.
Figure 8:
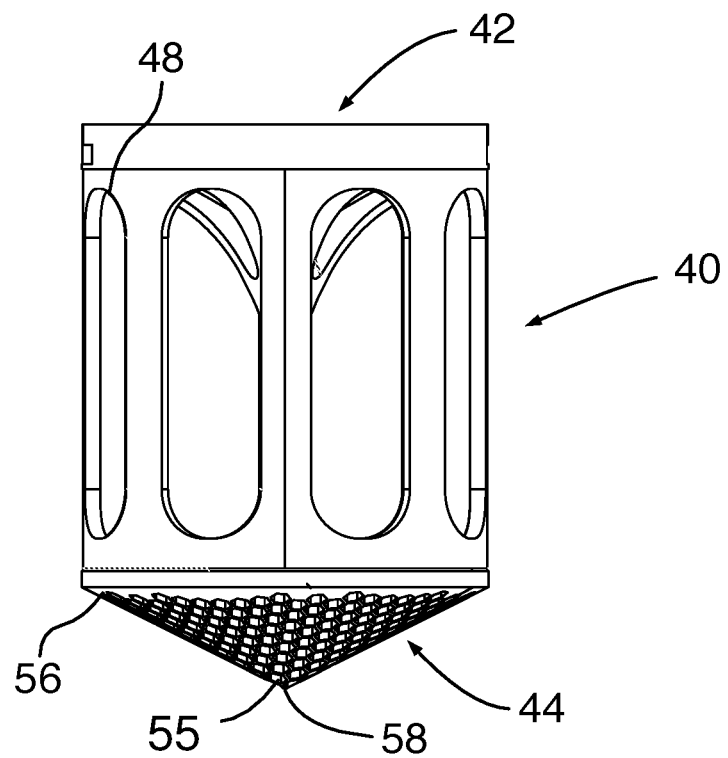
FIG. 8 is a front elevation view of an embodiment of a manual frothing device.
Figure 9:
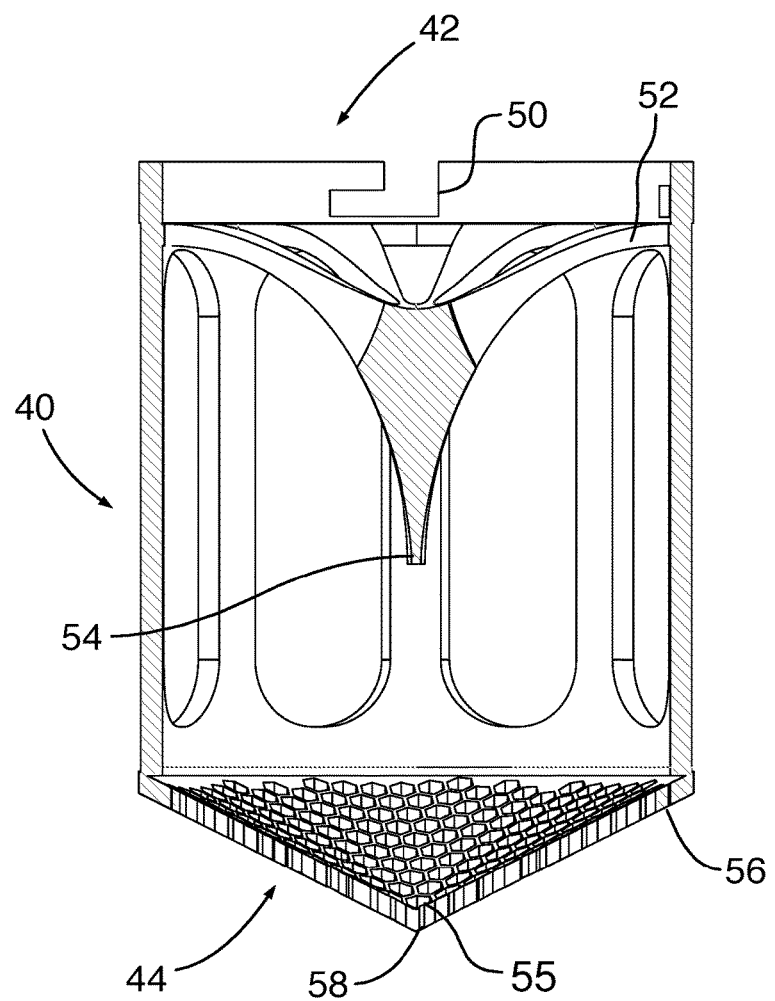
FIG. 9 is a front elevation, cross-sectioned view taken along lines 9-9 shown in FIG. 5 of an embodiment of a manual frothing device.

Further details of the invention and its advantages will be apparent from the detailed description included below.

DETAILED DESCRIPTION OF THE INVENTION

In the following description of the embodiments, references to the accompanying drawings are by way of illustration of an example by which the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus do not limit the terms or phrases they explain.

The term "i.e." and like terms mean "that is," and thus limit the terms or phrases they explain.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

With all this in mind, the present invention is directed to a manual frothing device to be secured inside a liquid container partially filled in with a liquid or a mixture to froth.

Now referring to FIG. 1, there is shown an embodiment in which a manual frothing device 10 is secured inside a liquid container 14.

While this has not been shown in the figures, it will be appreciated that the liquid container 14 is partially filled in with a liquid or a mixture to be frothed.

It will be appreciated that an example of use of the manual frothing device is to make Matcha, also referred to as Matcha tea, as further explained below.

Now referring to FIG. 2, there is shown the manual frothing device 10 secured inside a liquid container 14 using the top member 12.

In this embodiment, the cap 16 of the liquid container 14 has been removed. It will be appreciated that the cap 16 may be rotatably engaged to a top member 12 of the liquid container 14. It will be appreciated that the cap 16 may be secured to the top member 12 according to various alternative embodiments.

It will be appreciated that the cap 16 is typically removed from the top member 12 of the liquid container 14 when a user wants to have access to the inside of the liquid container 14, whether it is for drinking a liquid from it, cleaning the inside of it or inserting ingredients, e.g., water and powder, for the purpose of creating a drink.

It will be further appreciated that the cap 16 is secured to the top member 12 of the liquid container 14 when the user wants to use the manual frothing device 10 to make froth or when the user wants to transport the liquid container 14.

It will be appreciated that removing the cap 16 will create a passageway from the outside to the inside of the liquid container 14.

Now referring to FIG. 3, there is shown an exploded view illustrating the various elements used in one embodiment of the liquid container 14 containing the manual frothing device.

It will be appreciated that the manual frothing device 10 is secured inside the liquid container 14 using the top member 12 of the liquid container 14.

It will be further appreciated that the top member 12 of the liquid container 14 may be removed from the liquid container 14.

In the embodiment shown in FIGS. 1-3, the top member 12 is secured to the liquid container 14 using a threaded screw mount.

It will be further appreciated that, in the embodiment shown in FIGS. 1-3, the manual frothing device 10 is releasingly secured to the top member 12 of the liquid container 14 using two recesses and two corresponding prongs.

Now referring to FIGS. 4-6, there are shown various views of the manual frothing device 10.

The manual frothing device 10 comprises an elongated hollow member 40.

In the embodiment disclosed, the elongated hollow member 40 has a cylindrical shape. It will be appreciated by the skilled addressee that various alternative embodiments may be possible for the elongated hollow member 40. For instance, the elongated hollow member 40 may have a shape of a polygon having a given number of edges, such as a five-branch star, a square, etc. The elongated hollow member 40 may alternatively have a shape of polyhedrons—likely prisms—(flat sides) or cylinders (smooth).

It will be further appreciated that the elongated hollow member 40 has a top end 42 and a bottom end 44.

It will be appreciated that the top end 42 is hollow.

The top end 42 has an outside surface 52 extending inwardly in the manual frothing device 10.

As shown in the embodiment disclosed in FIGS. 4-6, the top end 42 comprises a plurality of openings on the outside surface 52, an example of which are openings 46.

In the embodiment disclosed, the outside surface 52 of the top end 42 comprises eight (8) openings. The skilled addressee will appreciated that various alternative embodiments may be provided for the number of openings located on the outside surface 52 of the top end 42 of the manual frothing device 10.

Each opening of the plurality of openings located on the outside surface 52 extends from a location close to a center 54 of the outside surface 52 of the top end 42 to a position located on a circle, not shown, defined by a given distance from the center of the outside surface 52. The circle is located proximal to an outside edge of the top end 42.

While each of the plurality of openings has a shape broadly resembling an isosceles triangle, when observed from a top plan view, it will be appreciated by the skilled addressee that various alternative embodiments may be possible. For instance each opening may have a shape of a round opening. Alternatively each opening may have a shape of a hexagon, a triangle, etc.

As mentioned above, the elongated hollow member 40 has also a bottom end 44.

The bottom end 44 is comprised of an outside surface 56.

The outside surface 56 extends outwardly. It will be appreciated that the outside surface 56 has a convex shape.

Moreover, it will be appreciated that the convex shape is symmetrical around an axis centered at a center 58 of the outside surface 56 and extending vertically between the center 58 of the outside surface 56 of the bottom end 44 and the center 54 of the outside surface 52 of the of the top end 42.

It will be appreciated that the outside surface 56 comprises a plurality of cavities, an example of which is cavity 55. The plurality of cavities are sized and shaped for retaining particles of a given size.

While the skilled addressee will appreciate that the size of the cavity may have various values depending on an application sought in one embodiment, each cavity has a size of approximately 2.0 mm.

In an alternative embodiment, the plurality of cavities located on the outside surface 56 have a size smaller than 2.0 mm.

It will be further appreciated that in an alternative embodiment a metal mesh may be used for providing the plurality of cavities located on the outside surface 56. In such embodiment, the bottom end 44 may be made of a metal mesh. Such metal mesh may be advantageous for cleaning and maintenance purposes of the manual frothing device 10.

It will be appreciated that the plurality of cavities will be used to typically filter particles having a size greater than the given size away from the liquid and trap them inside the manual frothing device 10 due to the convex shape of the outside surface 56 of the bottom end 44. It will be therefore appreciated that the convex shape defines a retaining zone for collecting particles in the liquid that have a size greater than the given size.

The manual frothing device 10 further comprises side walls on the elongated hollow member 40. The side walls comprise a plurality of openings, an example of which is opening 48.

Each of the plurality of openings has a size substantially greater than the particles of the given size.

Each opening of the plurality of openings extends vertically and substantially from the bottom end 44 to the top end 42 of the manual frothing device 10.

While there has been disclosed a particular shape for the plurality of openings, the skilled addressee will appreciate that various alternative embodiments may be possible for the shape of the plurality of openings.

Also, it will be appreciated that in the embodiment disclosed, the plurality of openings comprises eight (8) openings.

The manual frothing device 10 further comprises securing means 50 for securing the manual frothing device 10 to the top member 12.

In the embodiment disclosed, the securing means 50 are located at the top end 42 of the manual frothing device 10 and comprise two recesses that are sized and shaped for receiving two corresponding prongs located on a corresponding bottom end of the top member 12.

It will be appreciated that it is possible to secure the manual frothing device 10 against the top member 12 by engaging the manual frothing device 10 against the top member 12 such that the two corresponding prongs are engaged in the two corresponding recesses and then turning the manual frothing device 10 in a given direction with respect to the top member 12.

It will be appreciated that the manual frothing device 10 may be disengaged from the top member 12 by first turning the manual frothing device 10 in a direction opposite to the given direction with respect to the top member 12 and by then moving the manual frothing device 10 away from the top member 12.

The skilled addressee will appreciate that various alternative embodiments may be possible for the securing means 50, such as for instance a screw thread, friction-based connections, magnets, etc. For instance, in the embodiment where the securing means 50 comprises a screw thread, the top member 12 may comprise for instance an external thread while the liquid container 14 may comprise a corresponding internal thread. Alternatively, the top member 12 may comprise an internal thread while the liquid container 14 may comprise an external thread.

As a matter of fact, it will be appreciated that the securing means 50 are optional, since the manual frothing device 10 may be secured in a given position without them. For instance, prongs located on the inside surface of the liquid container 14 could be alternatively used to retain the manual frothing device 10 such that it does not go beyond a given position inside the liquid container 14 and therefore rests in a specific position. In such embodiment, the manual frothing device 10 is not provided with any securing means per se.

It will be appreciated that the manual frothing device 10, the top member 12 and the liquid container 14 may each be made using various materials and manufacturing techniques.

In one embodiment, the manual frothing device 10 is made of Eastman Tritan™ acrylic and is manufactured using injection molding process.

In one embodiment, the top member 12 is made of polypropylene and is manufactured using injection molding process.

In one embodiment, the liquid container 14 is made of double walled Eastman Tritan™ acrylic and is manufactured using injection molding and sonic welding or other adhesive process.

The skilled addressee will appreciate that the manual frothing device 10, the top member 12 and the liquid container 14 may be manufactured according to various alternative embodiments such as, for instance, using various plastics, metals, ceramics or composites/alloys thereof.

It will be further appreciated that in an alternative embodiment the manual frothing device 10 further comprises a ball located in the elongated hollow member 40. It will be appreciated that the purpose of the ball is to facilitate the agitation of the Matcha. It will be appreciated that the ball is larger than the largest opening on the elongated hollow member 40 so the ball can move freely and stay within the elongated hollow member 40 while the manual frothing device 10 is shaken. In one embodiment, the ball is made of a metal core coated with a soft silicone coating to prevent damage/wear to the manual frothing device.

Use of the Manual Frothing Device

It will be appreciated that the manual frothing device 10 disclosed may be used for various applications.

Typically, a liquid is inserted into the liquid container 14. As mentioned above, the liquid fills partially the liquid container 14.

The manual frothing device 10 is then secured to the top member 12.

The assembly comprised of the manual frothing device 10 and the top member 12 is then secured to the liquid container 14.

A powder may be inserted into the liquid container 14 before or after the assembly is secured to the liquid container 14.

In an alternative embodiment, a suitable liquid may be frothed without any powder. For instance, such liquid could be milk in one embodiment.

The cap 16 is then rotatably engaged to the top member 12 of the liquid container 14 and a user may then shake the liquid container 14.

A froth is created thanks to the combination of the plurality of openings located on the outside surface 52 and the plurality of cavities located on the outside surface 56 of the manual frothing device 10.

In the case where the powder is provided and has to be dissolved in the liquid, the plurality of openings are used for advantageously trapping particles having a size greater than the given size.

In order to remove the frothed liquid, the assembly comprised of the manual frothing device 10 and the top member 12 may be removed from the liquid container 14 to avoid inserting trapped particles back into the liquid.

In one embodiment, the manual frothing device 10 may be used for making Matcha tea.

In this embodiment, hot water and Matcha powder are inserted into the liquid container 14. In one embodiment, the Matcha powder is inserted before the hot water. In an alternative embodiment, the Matcha powder is inserted after the hot water.

The assembly comprised of the manual frothing device 10 and the top member 12 is then secured to the liquid container 14.

The user will then rotatably engage the cap 16 to the top member 12 of the liquid container 14 and start to shake the liquid container 14 until a desired result is obtained.

It will be appreciated that an advantage of the manual frothing device 10 disclosed herein is that it may distribute the Matcha powder that does not dissolve evenly through hot water to make a stable, homogeneous suspension.

Another advantage of the manual frothing device 10 disclosed herein is that it introduces air into the mixture and creates a "froth" or foam on top which is desirable in conventional Matcha making.

Another advantage of the manual frothing device 10 disclosed herein is that it traps larger particles of Matcha, which might prove stubborn to break down, in the cone of the filter, so that they do not transition to the user's cup when the beverage is poured out.

The skilled addressee will appreciate that the manual frothing device 10 may be used in various other applications in which a froth is desirable.

The design of the long cone with open sides directs the mixture down through the perforated cone when shaking.

Although the above description relates to a specific preferred embodiment as presently contemplated by the inventor, it will be understood that the invention in its broad aspect includes functional equivalents of the elements described herein.

The invention claimed is:

1. A manual frothing device to be secured inside a liquid container partially filled in by a liquid to froth, the frothing device comprising:
   an elongated hollow member having
   a top end comprising a top surface, the top surface having
      a first plurality of openings of a size greater than particles of a given size;
   a bottom end comprising a convex-shaped bottom surface extending outwardly and comprising a second plurality of openings sized and shaped for retaining the particles of the given size; and
   side walls extending between the top end and the bottom end, and having a third plurality of openings of a size greater than the particles of the given size;

wherein the top surface, the bottom surface and the side walls define an interior of the hollow member; and
wherein froth is generated by shaking the liquid in the container.

2. The manual frothing device as claimed in claim 1, wherein the manual frothing device further comprises securing means for securing the manual frothing device inside the liquid container.

3. The manual frothing device as claimed in claim 2, wherein the securing means are located at the top end of the elongated hollow member.

4. The manual frothing device as claimed in claim 3, wherein the securing means comprises two recesses that are sized and shaped for receiving two corresponding prongs located on a top member to be secured to the liquid container.

5. The manual frothing device as claimed in claim 3, wherein the securing means comprise a screw thread.

6. The manual frothing device as claimed in claim 1, wherein the first plurality of openings comprises eight holes.

7. The manual frothing device as claimed in claim 1, wherein the third plurality of openings comprise eight openings of a size greater than the particles of a given size.

8. The manual frothing device as claimed in claim 1, wherein the elongated hollow member has a cylindrical shape.

9. The manual frothing device as claimed in claim 1, wherein the top surface extends inwardly in the elongated hollow member.

10. The manual frothing device as claimed in claim 1, wherein the top surface is symmetrical around an axis extending in the lengthwise direction along a center of the elongated hollow member.

11. The manual frothing device as claimed in claim 1, wherein the convex-shaped bottom surface is symmetrical around an axis extending in the lengthwise direction along a center of the elongated hollow member.

12. The manual frothing device as claimed in claim 1, wherein the second plurality of openings each has a diameter size of 2 mm.

13. The manual frothing device as claimed in claim 1, wherein the convex-shaped bottom end is made of a metal mesh.

14. The manual frothing device as claimed in claim 1, wherein the manual frothing device is made of Eastman Tritan(TM) acrylic.

15. The manual frothing device as claimed in claim 1, further comprising a ball located in the elongated hollow member.

16. The manual frothing device as claimed in claim 15, wherein the ball comprises a metal core coated with silicon.

* * * * *